UNITED STATES PATENT OFFICE 2,606,140

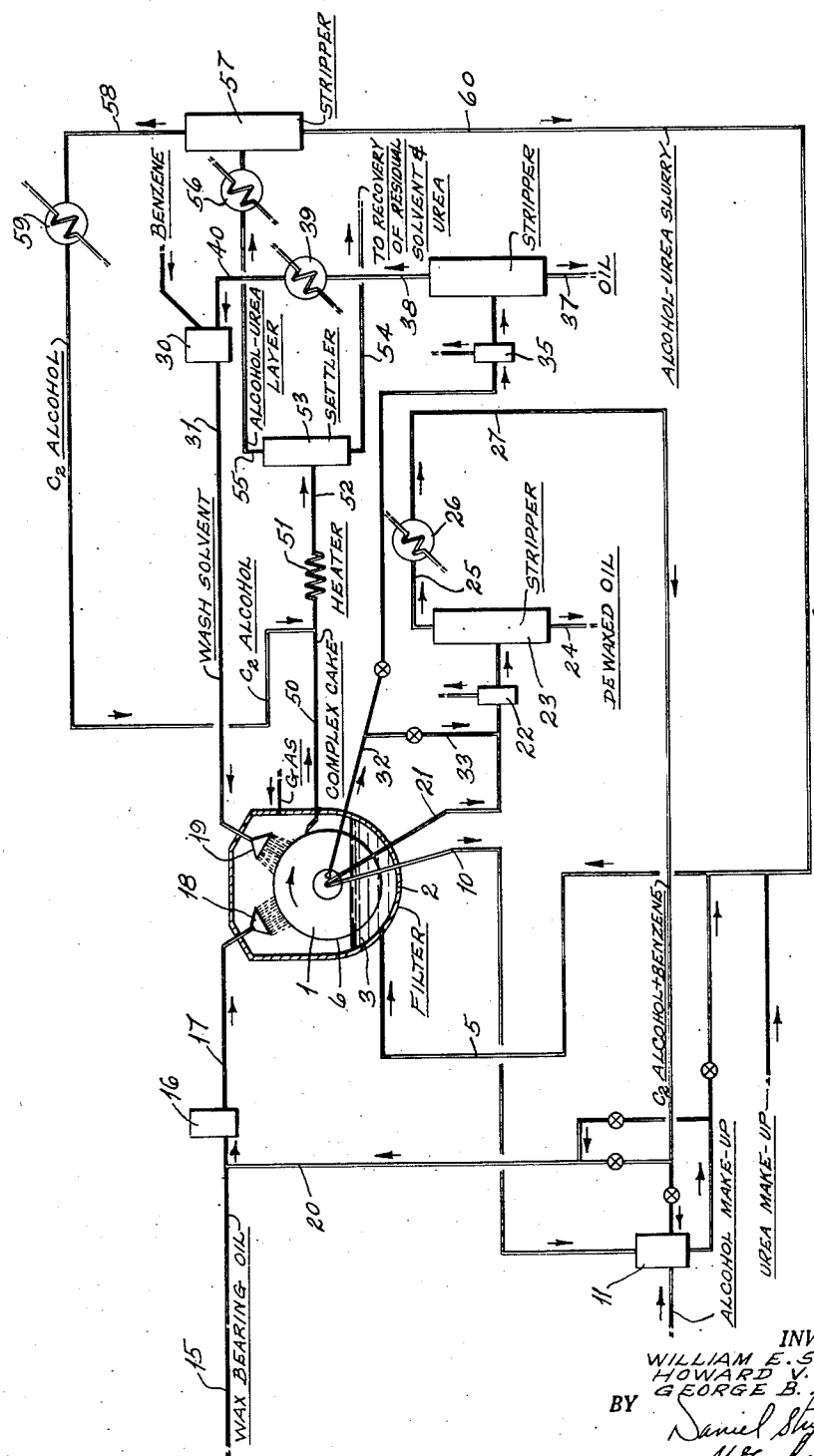

SEPARATION OF WAX CONSTITUENTS AND THE LIKE FROM OIL

George B. Arnold, Glenham, and Howard V. Hess and William E. Skelton, Beacon, N. Y., assignors to The Texas Company, New York, N. Y., a corporation of Delaware Application December 30, 1948, Serial No. 68,138

6 Claims. (Cl. 196—19)

This invention relates to the treatment of oils such as hydrocarbon mixtures and the like to effect separation therefrom of constituents which, under suitable conditions, in the presence of a complexing agent such as urea, form crystalline complexes which are readily separable from the mixture undergoing treatment.

It has been found that waxy constituents of oil form crystalline complexes with organic compounds having the structure:

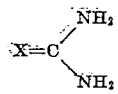

where X may be either oxygen or sulfur. Examples of such complexing agents are urea and thiourea, respectively.

These complexing agents are useful in effecting separation between wax and normally liquid constituents of mineral oil, but under suitable conditions may be used to effect separation of other constituents such as aromatic and naphthenic compounds having long aliphatic side chains. In the case of separating wax from mineral oil, the resulting complex appears to be a definite chemical compound consisting of about 25% wax and 75% urea by weight. The crystal structure appears to involve a hexagonal system. Complex formation is facilitated by the presence of a small amount of alcohol, water or other polar liquid capable of dissolving urea. The complex forms at ordinary temperatures as, for example, in the range normal room temperature to about 125° F. and may be decomposed by heating to temperatures in the range of about 150 to 180° F. or higher.

The present invention is particularly concerned with a novel method of effecting the complexing action and the removal of the resulting complex from the liquid by filtration, advantageously with a continuous rotary drum type of filter such as described, for example, in U. S. Patent 2,449,902 granted to Wynkoop Kiersted.

In practicing the method of this invention with a filter of the type mentioned, a slurry of complexing agents such as urea in a polar solvent liquid such as a low molecular weight aliphatic alcohol is maintained in the filter bowl such that the filter drum is submerged therein to a substantial depth during its rotation. A pressure differential is applied across the submerged filtering surface so that the solvent liquid flows through the filtering surface as a filtrate while the solid complexing agent is deposited upon the surface as a filter cake.

Upon continued rotation of the drum, the filtering surface bearing the cake of complexing agent emerges from the slurry body. During its emergence, a stream of feed oil containing the aforesaid constituents capable of entering into complex formation with the agent is supplied to or projected upon the emerged cake-bearing surface while continuing to apply a pressure differential across the filtering surface, thereby causing liquid to flow through the cake and filtering surface as filtrate while the aforesaid constituents of the feed oil enter into complex formation with the complexing agent to form crystalline complex material remaining on the filter surface as filter cake.

Upon further rotation of the emerged cake-bearing surface, inert gas may be forced therethrough to effect drying of the cake. Advantageously, and with or without the aforesaid previous drying, the emerged filtering surface bearing the cake of complex material is subjected to the action of the stream of solvent liquid, preferably a non-polar compound, capable of dissolving residual oil adhering to the filter cake and removing it as filtrate as a result of application of a pressure differential across the filtering surface during such washing.

Following this washing of the emerged filter cake, it may be subjected to further drying by forcing additional inert gas therethrough to remove the final traces of liquid as filtrate.

Thereafter the filter cake comprising crystalline complex and any unused complexing agent is discharged in the conventional manner. The discharged filter cake and the discharged filtrate streams are thereafter treated in any suitable manner such as will be described later in more detail to effect recovery of solvent liquids and complexing agents for reuse in the process.

Reference will now be made to the accompanying drawing which illustrates one method of applying the invention to the separation of wax from wax-bearing mineral oil, for example, a low viscosity lubricating oil distillate having a pour point of about +20° F., a Saybolt Universal viscosity of about 180 seconds at 100° F. and containing about 5% by volume of wax. The operation will be described with reference to the use of urea as the complexing agent and employing it in the form of a slurry in ethyl alcohol.

The numeral 1 refers to a more or less conventional rotary drum filter which may operate under subatmospheric, atmospheric or superatmospheric pressures. It is believed unnecessary to describe the filter structure in detail since it is well known and is generally similar to that referred to in the previously mentioned patent.

As indicated in the drawing, the bowl 2 of the filter contains a body of slurry 3. This slurry comprises urea crystals suspended in ethyl alcohol which is saturated with urea, at about 100° F. At this temperature saturated ethyl alcohol contains about 8% by weight of dissolved urea. Advantageously, the excess urea in the slurry is sufficient to provide a slurry mixture containing about 15 to 20% solids by volume.

The slurry feed is supplied to the filter bowl through a pipe 5 from a source referred to later. The filter is advantageously maintained at about 100° F. or at a temperature ranging from say normal room temperature to 125° F. Filter drum 6 is maintained about 30 to 40% submerged in the slurry mixture. During rotation of the submerged portion filtration occurs as a result of applying a pressure differential through the filtering surface, thereby causing alcohol to flow through the filtering surface as filtrate while urea crystals are deposited on the submerged filter surface in the form of a filter cake. The alcohol filtrate is removed through the conventional filter valve and discharged through a pipe 10 leading to a tank 11 from which it may be returned for reuse.

The filter drum rotates in a clockwise direction as indicated and upon rotation the submerged filtering surface bearing the filter cake of urea crystals wet with alcohol emerges from the slurry body in the filter bowl and thereafter comes into contact with entering feed oil.

As indicated in the drawing, wax-bearing oil feed is conducted from a source not shown through a pipe 15 to a surge tank 16 from which it flows through a pipe 17 to distributing nozzles 18 within the filter hood. Instead of nozzles, a weir trough may be employed for securing uniform deposition of the entering feed oil onto the emerged cake-bearing filter surface.

If desired, the wax-bearing oil may be initially diluted with alcohol or other solvent. Thus, the diluting solvent may be introduced from pipe 20 into pipe 15 for mixing with the entering feed oil stream and the resulting dilute mixture then conducted to the filter.

As the filtering surface passes under the nozzles or weir 18, a pressure differential across the filtering surface is applied, thereby causing filteration to occur. Wax constituents of the oil upon coming into contact with the alcohol-wet urea crystals enter into complex formation therewith forming a crystalline complex mass which is characterized by good filtering qualities. The resulting complex material remains as filter cake on the rotating filter surface while the oil or oil and diluent from which the wax constituents have been removed continues through the filtering surface in the form of a filtrate of dewaxed oil.

The resulting filtrate of dewaxed oil is removed through the filter valve and discharged through a pipe 21 leading to a surge drum 22 and from which the dilute oil may be conducted to a stripper 23 for removal of diluents or solvent therefrom. While not shown, provision may be made for separately removing residual small amounts of urea and alcohol which may have remained in the oil. Dewaxed oil from which the solvent and urea have been recovered and having a pour point of minus 15° F., is discharged through pipe 24. The recovered solvent is removed overhead as a distillate through pipe 25 and condenser 27 from which it is discharged through pipe 27 into the aforesaid tank 11 or through pipe 20 or mixed directly with the entering feed oil stream.

Returning again to the filter; upon further rotation of the emerged filter surface now bearing a filter cake comprising mainly complex and which may retain unused crystalline urea in substantial amount, it is subjected to washing with a wash solvent, preferably a solvent liquid such as an aromatic hydrocarbon having a high solvent action upon mineral oil and relatively low solubility for the complex material. Benzene is a satisfactory washing solvent and a stream thereof is conducted from the tank 30 through pipe 31 to a set of nozzles 19 within the filter hood as indicated. During rotation through this washing zone, the application of a pressure differential is maintained through the filtering surface thereby effecting filtration so that wash solvent containing dissolved oil that was retained in the filter cake is removed as a filtrate through the filter valve and discharged through pipe 32. If desired, this wash filtrate may be discharged all or in part through pipe 21 since it contains dewaxed oil in substantial amount.

If desired, it may be diverted from pipe 32 through pipe 33 to the previously mentioned tank 22. On the other hand, it may be passed directly to a separate tank 35 from which it is discharged to a separate stripper 36 for recovery of solvent and residual urea from the oil. The oil is discharged through pipe 37 while the recovered solvent is removed through pipe 38, condenser 39 and pipe 40 for return to the tank 30. As in the case of the previously described stripping operation, provision may be made for the separate recovery of solvent and residual urea from the oil removed as filtrate through pipe 32.

The washed filter cake is now advantageously subjected to drying by forcing gas through the emerged filter surface, such gas being drawn from the interior of the hood through the filter surface and being discharged through the filter valve and discharge pipes. As indicated, the receiving tanks 22 and 35 are provided with means for venting gas drawn through the filter. It will be understood, of course, that provision may be made for returning the vented gas to the interior of the filter hood. Advantageously, this gas is inert such as flue gas in order to prevent explosions.

The resulting dried filter cake is discharged in the conventional manner through conduit 50. Upon discharge from the filter, it may be mixed with hot alcohol or with relatively cool alcohol and the resulting mixture passed through a heat exchanger 51 wherein it is heated to a temperature of about 180° F. or sufficiently high to decompose the complex and dissolve the urea in the alcohol.

The resulting mixture is conducted through pipe 52 to a settling vessel 53 under pressures sufficient to maintain the alcohol in a liquid condition. In the settler, phase separation occurs with formation of a lower liquid layer of molten wax and an upper liquid layer of ethyl alcohol and dissolved urea.

The wax layer is drawn off through pipe 54 to a recovery unit not shown for the recovery of residual alcohol and urea.

The alcohol layer is drawn off through pipe 55 and cooler 56 to a stripper 57 wherein it is subjected to distillation. Alcohol, free from urea, is taken overhead through pipe 58, and exchanger 59, and recycled to heater 51 and used for commingling with the filter cake discharged from the filter.

An alcohol-urea slurry is drawn off from the bottom of the stripper 57 through a pipe 60 which communicates with the previously mentioned pipe 5 for return to the filter bowl.

As indicated, provision may be made for addition of make-up alcohol and urea to compensate for losses incurred during continued operation.

While ethyl alcohol has been referred to, it is contemplated that other alcohols, either branch chain or straight chain, may be employed. It is advantageous to employ aliphatic alcohols having from about 1 to 5 carbon atoms per molecule. Other solvents may be employed which, like these alcohols, have a low miscibility with oil and are capable of dissolving the complexing agent at elevated temperatures. Examples of other suitable solvents are: acetone, methyl ethyl ketone, low boiling amines, such as ethyl amine, low boiling mercaptans, such as ethyl mercaptans, ethylene glycol, ethanol amine, water and similar polar compounds capable of dissolving urea and having limited mutual solubility with the oil.

Likewise, wash solvents other than benzene may be employed as for example: low boiling hydrocarbons, such as pentane, hexanes, toluene, light naphtha, etc., which are completely miscible with the oil undergoing treatment.

Although reference has been made to using two different type solvents in the operation, it is possible that a common solvent may be used in some cases. In such event, it would be advantageous to use a C₃ or higher alcohol in order to attain sufficient oil solubility for effective cake washing. It would also be preferable to have the wash solvent essentially saturated with the complexing agent to prevent complex breaking.

The polar solvent used for forming the slurry advantageously is one that is substantially immiscible with oil and wax at temperatures up to about 150 to 180° F., while having substantially complete solvent action on the complexing agent at these elevated temperatures but only limited or very little solvent action on the agent at the filtering temperatures.

The process may be applied to the removal of residual wax from a wax-bearing oil that has previously been subjected to dewaxing by conventional filtration or centrifuging in the presence of a diluent or solvent at low temperature and thus effect a further reduction in the pour point of the oil. On the other hand, it may be used to effect a preliminary removal of wax such as a selected fraction of the wax prior to conventional dewaxing. The wax oil feed may be a mixture of relatively wide boiling range or may be a mixture of relatively narrow boiling range, such as the individual fractions obtained by fractional distillation of wax distillate. It may be applied to the separation of oil from slack wax or wax constituents.

It may also be applied to the treatment of used lubricating oils to remove undesired constituents therefrom. It is advantageously applied to the treatment of relatively low viscosity oils such as gas oils or oils useful in the manufacture of diesel oil or useful in the manufacture of lubricants for refrigerators or turbines.

Complexing agents such as urea enter into complex formation with oxygenated hydrocarbons and other oxygen containing compounds. Therefore, it is contemplated that the invention may be applied to the treatment of oils derived from animal, vegetable and marine sources.

Obviously many modifications and variations of the invention, as hereinbefore set forth, may be made without departing from the spirit and scope thereof, and therefore only such limitations should be imposed as are indicated in the appended claims.

We claim:

1. A process for separating from oil constituents thereof which form crystalline complexes with an organic complexing agent having the structure:

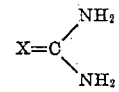

where X is selected from the group consisting of oxygen and sulfur and wherein the resulting crystalline complex is separated from the oil in the presence of the solvent liquid by continuous filtration at a temperature in the range of normal room temperature and higher with a filter surface which consecutively submerges within a liquid body and then emerges therefrom on each cycle, which comprises maintaining as said liquid body a slurry of solid particles of said complexing agent in a polar solvent liquid partially miscible with said agent and said feed oil, subjecting the filter surface to a pressure differential during submergence in said body such that solvent passes through the surface and a filter cake consisting essentially of solid complexing agent and adhering solvent is formed on said surface, supplying feed oil containing aforesaid complex-forming constituents in a continuous stream onto the emerged cake-bearing filter surface while applying a pressure differential thereto whereby oil passes through the filter surface and is discharged therefrom as filtrate, effecting formation of a crystalline complex of said constituents with said complexing agent in the filter cake upon said emerged surface, said resulting complex remaining on the emerged filter surface as filter cake, and thereafter removing the filter cake comprising complex from the emerged filter surface.

2. The method according to claim 1 in which the pressure differential on the filter surface is continued for a substantial period of time after formation of the complex cake thereon to thereby dry the filter cake.

3. The method according to claim 1 in which the emerged filter surface bearing the filter cake of complexed material is subjected to washing with solvent liquid prior to filter cake removal therefrom, thereby removing residual oil from the filter cake.

4. A process for separating from wax bearing oil wax constituents thereof which form crystalline complexes with an organic complexing agent having the structure:

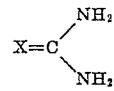

where X is selected from the group consisting of oxygen and sulfur and wherein the resulting crystalline complex is separated from the oil in the presence of the solvent liquid by continuous filtration at a temperature in the range of normal room temperature and higher with a filter surface which consecutively submerges within a liquid body and then emerges therefrom on each cycle, which comprises maintaining as said liquid body a slurry of solid particles of said complexing agent in a polar solvent liquid partially miscible with said agent and said feed oil, subjecting the filter surface to a pressure differential during submergence in said body such that solvent passes through the surface and a filter cake consisting essentially of solid complexing agent and adhering agent is formed on said surface, supplying feed oil containing wax in a continuous stream onto the emerged cake-bearing filter surface while applying a pressure differential thereto whereby oil passes through the filter surface and is discharged therefrom as filtrate, effecting formation of a crystalline complex of wax with said complexing agent in the filter cake upon said emerged surface, said resulting complex remaining on the emerged filter surface as filter cake, and thereafter removing the filter cake comprising complex from the emerged filter surface.

5. The method according to claim 4 in which the complexing agent is urea and the solvent used in forming the slurry is ethyl alcohol.

6. The method according to claim 4 in which the resulting filter cake of complexed material is washed in situ with wash solvent comprising benzene.

GEORGE B. ARNOLD.
HOWARD V. HESS.
WILLIAM E. SKELTON.

REFERENCES CITED

The following references are of record in the file of this patent:

UNITED STATES PATENTS

| Number | Name | Date |
| --- | --- | --- |
| 2,337,385 | Gross | Dec. 21, 1943 |
| 2,350,944 | Thornton | June 6, 1944 |
| 2,499,820 | Fetterly | Mar. 7, 1950 |

OTHER REFERENCES

Technical Oil Mission, Reel 143, translation by Shell Development Co., of German application B 190, 197 (Bengen), included in Index released May 31, 1946 (copy available in Library of Congress), 5 pages, pages 2-6, inclusive only.